US012578981B2

(12) United States Patent
Lin

(10) Patent No.: US 12,578,981 B2
(45) Date of Patent: Mar. 17, 2026

(54) GAME TRANSLATION METHOD, AND ELECTRONIC DEVICE, AND COMPUTER READABLE MEDIUM THEREOF

(71) Applicant: NETEASE (HANGZHOU) NETWORK CO., LTD., Hangzhou (CN)

(72) Inventor: Wanghong Lin, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 169 days.

(21) Appl. No.: 18/565,551

(22) PCT Filed: Feb. 24, 2022

(86) PCT No.: PCT/CN2022/077576
§ 371 (c)(1),
(2) Date: Nov. 30, 2023

(87) PCT Pub. No.: WO2022/257503
PCT Pub. Date: Dec. 15, 2022

(65) Prior Publication Data
US 2024/0256312 A1 Aug. 1, 2024

(30) Foreign Application Priority Data

Jun. 10, 2021 (CN) .......................... 202110649513.5

(51) Int. Cl.
*G06F 9/44* (2018.01)
*G06F 9/445* (2018.01)
*G06F 9/451* (2018.01)
(52) U.S. Cl.
CPC .......... *G06F 9/454* (2018.02); *G06F 9/44521* (2013.01)

(58) Field of Classification Search
None
See application file for complete search history.

(56) References Cited

U.S. PATENT DOCUMENTS 6,721,941 B1 4/2004 Morshed et al.
2003/0236658 A1 12/2003 Yam
(Continued)

FOREIGN PATENT DOCUMENTS

CN 1364260 A 8/2002
CN 101201821 A 6/2008
(Continued)

OTHER PUBLICATIONS

1st Office Action dated Apr. 28, 2022 of Chinese Application No. 202110649513.5.
(Continued)

*Primary Examiner* — Insun Kang
(74) *Attorney, Agent, or Firm* — Qinghong Xu

(57) ABSTRACT

A game translation method, an electronic device, and a computer readable medium are provided. The method includes: providing a target operating system on a terminal device by running a simulator, wherein the simulator is an application program configured on the terminal device; in response to a trigger operation on an icon of a target game program in the simulator, controlling running of the target game program in the target operating system; determining a target file in the target game program, wherein the target file includes code logic for first interface text setting; setting code logic with translation function in the code logic for first interface text setting, and translating original text information in a game interface by the code logic with translation function to obtain target text information; and displaying,
(Continued)

Preparing a containerized environment

↓

Preparing a Unity 3D game process environment

↓

Hooking the "dlopen" function of the "libdl.so" library, and intercepting the loading of the ".so" library

↓

Intercepting the loading of the "libil2cpp.so" library of Unity 3D game logic

↓

Hooking the API of UI text settings such as Text.set_ext in the game logic

↓

Obtaining the text displayed in the game UI and translating the text

↓

Calling the original logic for text setting of the game to display the translation result through code logic for second interface text setting, a corresponding game interface according to the target text information.

14 Claims, 6 Drawing Sheets

(56)                    References Cited

U.S. PATENT DOCUMENTS

| | | | |
|---|---|---|---|
| 2006/0100847 | A1 | 5/2006 | McEntee et al. |
| 2014/0281376 | A1 | 9/2014 | Yamada et al. |
| 2018/0024848 | A1* | 1/2018 | Dmytryshyn ........... G06F 9/454 |
| | | | 704/8 |
| 2019/0188004 | A1* | 6/2019 | Wisgo ..................... G06F 8/656 |
| 2020/0159552 | A1* | 5/2020 | Bodin ..................... G06F 9/454 |
| 2020/0401425 | A1* | 12/2020 | Wang ...................... G06F 9/454 |
| 2021/0165855 | A1* | 6/2021 | Stuehler ................. G06F 9/454 |
| 2022/0126199 | A1* | 4/2022 | Zhang ................. G06F 9/45558 |
| 2022/0138437 | A1* | 5/2022 | Bullock ................. G06F 9/454 |
| | | | 704/2 |

FOREIGN PATENT DOCUMENTS

| | | | |
|---|---|---|---|
| CN | 101523348 | A | 9/2009 |
| CN | 103309647 | A | 9/2013 |
| CN | 104536955 | A | 4/2015 |
| CN | 109960511 | A | 7/2019 |
| CN | 110134404 | A | 8/2019 |
| CN | 111160045 | A | 5/2020 |
| CN | 111723002 | A | 9/2020 |
| CN | 113342436 | A | 9/2021 |
| WO | 0029964 | A1 | 5/2000 |

OTHER PUBLICATIONS

International Search Report dated May 6, 2022 of International Application No. PCT/CN2022/077576.

* cited by examiner

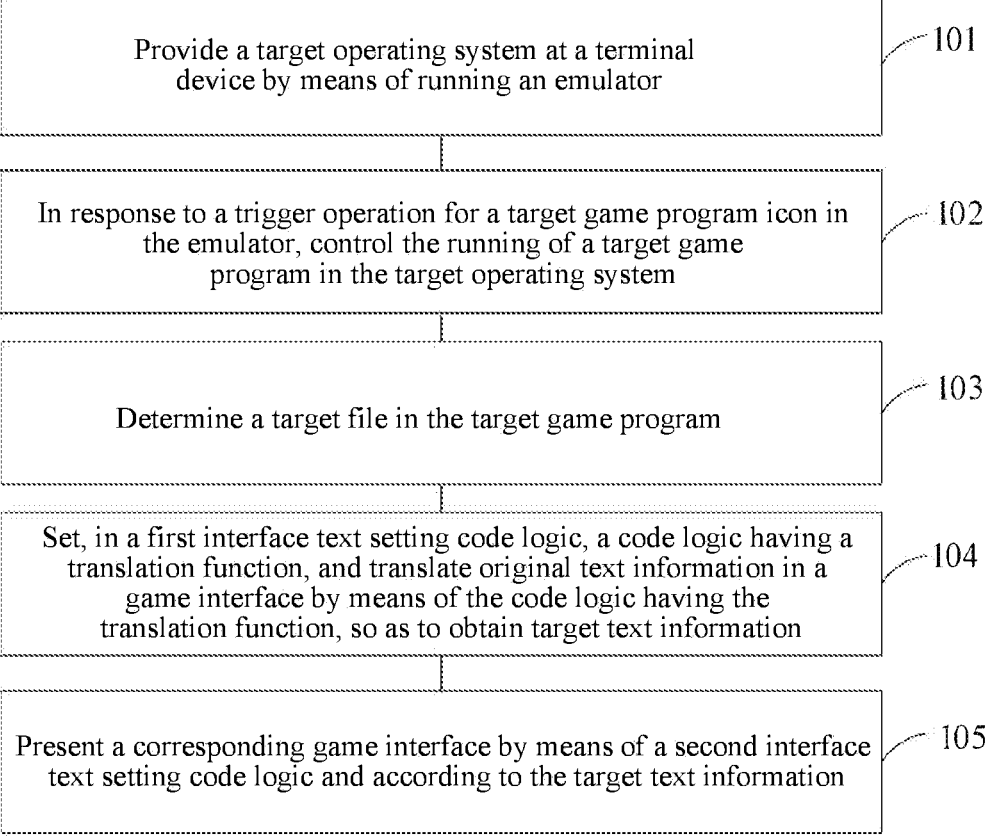

Provide a target operating system at a terminal
device by means of running an emulator          ╭─ 101

In response to a trigger operation for a target game program icon in
the emulator, control the running of a target game
program in the target operating system          ╭─ 102

Determine a target file in the target game program          ╭─ 103

Set, in a first interface text setting code logic, a code logic having a
translation function, and translate original text information in a
game interface by means of the code logic having the
translation function, so as to obtain target text information          ╭─ 104

Present a corresponding game interface by means of a second interface
text setting code logic and according to the target text information          ╭─ 105

FIG.1

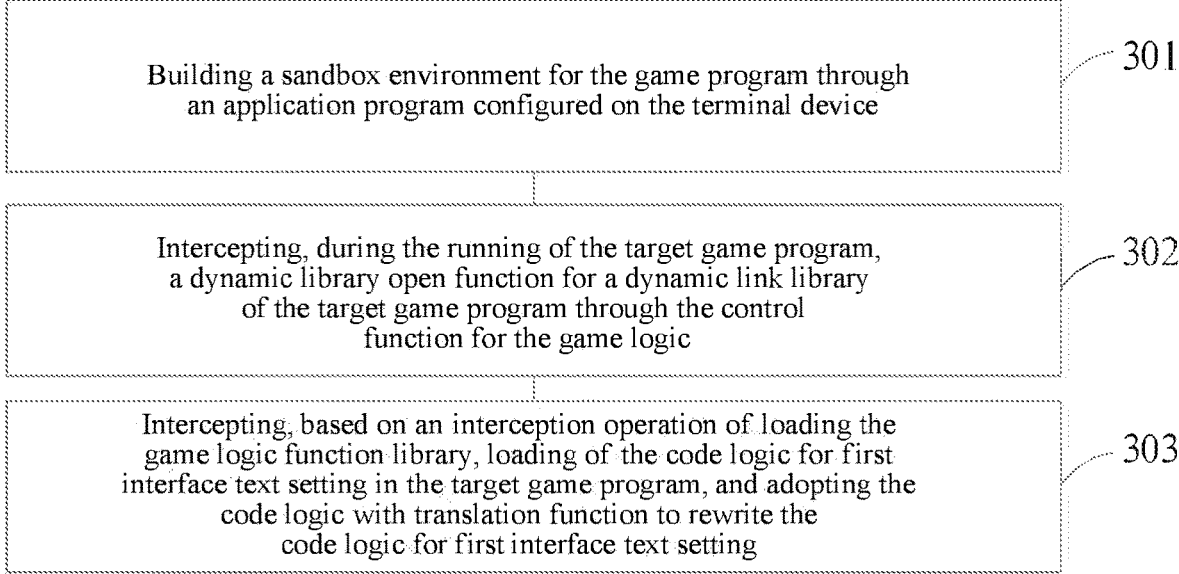

Building a sandbox environment for the game program through
an application program configured on the terminal device

╭─ 301

Intercepting, during the running of the target game program,
a dynamic library open function for a dynamic link library
of the target game program through the control
function for the game logic

╭─ 302

Intercepting, based on an interception operation of loading the
game logic function library, loading of the code logic for first
interface text setting in the target game program, and adopting the
code logic with translation function to rewrite the
code logic for first interface text setting

Target operating system
providing module — 501

Game program running module — 502

Target file determination module — 503

Original text information
translation module — 504

Interface text display module — 505

GAME TRANSLATION METHOD, AND ELECTRONIC DEVICE, AND COMPUTER READABLE MEDIUM THEREOF

CROSS-REFERENCE TO RELATED APPLICATIONS

The present disclosure is a U.S. national phase application of International Application No. PCT/CN2022/077576, filed on Feb. 24, 2022, which is based on and claims priority to Chinese Patent Application No. 202110649513.5, filed on Jun. 10, 2021, titled "GAME TRANSLATION METHOD AND APPARATUS", the entire contents of both of which are incorporated herein by reference for all purposes.

TECHNICAL FIELD

The present disclosure relates to the field of computer technologies and, in particular, to a game translation method, an electronic device, and a computer medium.

BACKGROUND

Unity 3D is a game engine developed by Unity. At present, there are a large number of games on the market based on this game engine. Among them, some foreign games do not support Chinese language in their game interfaces, which makes it difficult for users whose native language is Chinese to run the game, and causes a certain degree of obstacle for game developers and designers to learn from and study foreign games.

It should be noted that the information disclosed above in the background section is only used to enhance the understanding of the background of the present disclosure, and therefore may include information that does not constitute prior art known to those of ordinary skill in the art.

SUMMARY

The present disclosure provides a game translation method, an electronic device, and a computer medium.

According to some embodiments of the present disclosure, a game translation method is provided, including:

providing a target operating system on a terminal device by running a simulator, wherein the simulator is an application program configured on the terminal device;

in response to a trigger operation on an icon of a target game program in the simulator, controlling running of the target game program in the target operating system;

determining a target file in the target game program, wherein the target file includes code logic for first interface text setting;

setting code logic with translation function in the code logic for first interface text setting, and translating original text information in a game interface by the code logic with translation function to obtain target text information; and displaying, through code logic for second interface text setting, a corresponding game interface according to the target text information.

According to some embodiments of the present disclosure, an electronic device is provided, including a processor, a memory, and a computer program stored in the memory and runnable on the processor, which, when run by the processor, causes the processor to: provide a target operating system on the electronic device by running a simulator, wherein the simulator is an application program configured on the electronic device: control, in response to a trigger operation on an icon of a target game program in the simulator, running of the target game program in the target operating system: determine a target file in the target game program, wherein the target file comprises code logic for first interface text setting; set code logic with translation function in the code logic for first interface text setting, and translate original text information in a game interface by the code logic with translation function to obtain target text information; and display, through code logic for second interface text setting, a corresponding game interface according to the target text information.

According to some embodiments of the present disclosure, a non-transitory computer-readable storage medium is provided. The computer-readable storage medium stores a computer program, which, when run by a processor, causes the processor to: provide a target operating system on a terminal device by running a simulator, wherein the simulator is an application program configured on the terminal device: control, in response to a trigger operation on an icon of a target game program in the simulator, running of the target game program in the target operating system; determine a target file in the target game program, wherein the target file comprises code logic for first interface text setting; set code logic with translation function in the code logic for first interface text setting, and translate original text information in a game interface by the code logic with translation function to obtain target text information; and display, through code logic for second interface text setting, a corresponding game interface according to the target text information.

BRIEF DESCRIPTION OF THE DRAWINGS

In order to more clearly illustrate the technical solutions in the embodiments of the present disclosure, the accompanying drawings to be used in the descriptions of the embodiments will be briefly described below. It is obvious that the accompanying drawings in the following description show some of the embodiments of the present disclosure, and for those of ordinary skill in the art, other accompanying drawings can be obtained based on these drawings without making creative labor.

FIG. 1 is a flowchart of a game translation method according to one or more embodiments of the present disclosure.

FIG. 3 is a flowchart of a game translation method according to one or more embodiments of the present disclosure.

DETAILED DESCRIPTION

Figure 2:
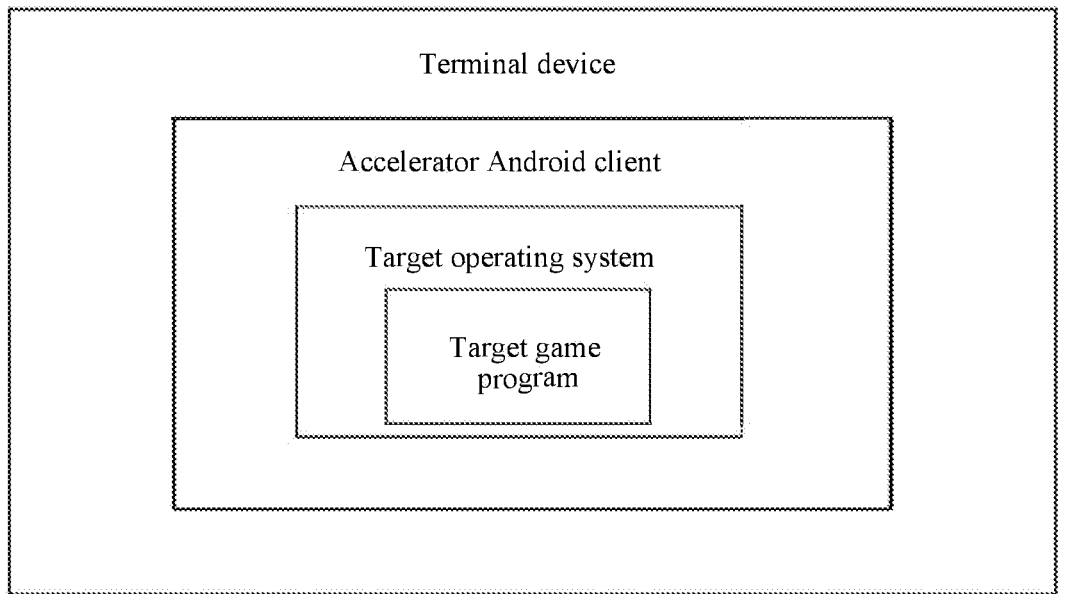
FIG. 2 is a schematic diagram of a relationship between a running simulator and a target game program according to one or more embodiment of the present disclosure.

In order to make the above purpose, features and advantages of the present disclosure more comprehensible, the present disclosure is further described in detail below in conjunction with the accompanying drawings and specific embodiments.

In order to facilitate those skilled in the art to understand the present disclosure, the terms or nouns involved in the following embodiments of the present disclosure are explained below.

"Unity 3D" refers to a game engine developed by Unity, which may be equivalent to a comprehensive multi-platform game development tool. It allows players to easily create interactive contents such as 3D video games, architectural visualizations, and real-time 3D animations.

"Hook" is a kind of modification and replacement operation of a function call point in the computer's memory.

"Inline hook" is a specific hook technology that only rewrites and replaces the memory at a function implementation point.

"API", i.e., Application Interface, is a software call service provided by an operating system or background application.

"SO" stands for Shared Object. It is a dynamic shared library and is a technology for computers to share common logic codes.

"IL2CPP" stands for Intermediate Language to C++. It is a script backend developed by Unity that can convert C#script code into C++ code for compilation and operation, improving the efficiency and safety of game operation.

"Android", i.e., Android system, refers to a popular mobile operating system developed by Google.

"Windows" is a widely used desktop operating system developed by Microsoft Corporation.

"DLL", i.e., Dynamic Link Library, can be an implementation of a dynamic link library that is used in the Windows operating system and developed by Microsoft.

The language used and displayed on the computer software interface may specifically be sourced from a separate language resource package, which may contain one or more languages. When the software is running, the language resource package may be loaded and displayed on the software interface in the corresponding language according to the specific logic rules of the software, which provides users with guidance on how to use the software.

When the computer software is a game software developed by the Unity 3D game engine, the current translation or localization of the game software may be realized through manual translation of the language resource package, specifically using the open-source Unity 3D resource modification tools or tool libraries to manually extract and translate language resources (including text, pictures, etc.), and then repackaging the translated language resources into a language resource package, which in turn are loaded through the running of the game to achieve the purpose of game translation or localization.

However, the above-mentioned method of realizing game translation or localization through manual operation of the language resource package may have the following disadvantages. (1) Due to the non-public nature of the format and changes in upgrades, the format of the language resource package is prone to compatibility issues. (2) The file format for organizing language resource entries in the resource package is not uniform, and specific logic needs to be written for a specific game, which results in poor generality. (3) Since the game may have a mechanism for checking the integrity of the language resource package, methods for bypassing this check mechanism need to be considered. (4) Since only the language resource package is processed, finding the language resource package from a large number of game resource packages requires additional operations, and not all of the UI languages of some games are in a extractable language resource package (which may be embedded in the code), the results of translation or localization are not comprehensive enough and are reflected in the game as many menus or interfaces are not successfully translated or localized, and thus there may still be a use threshold in terms of language barriers. (5) The program is not very maintainable, and every time the game is upgraded or changed, the language resource package needs to be reprocessed for the new version.

One of the core concepts of the embodiments of the present disclosure is based on the technology of containerization and general translation, which provides relatively general Unity 3D game localization or translation technology. In some embodiments, by hooking the APIs related to the UI text setting, it may theoretically cover all IL2CPP-based Unity 3D games, without specific logic processing for specific games, which reduces the game use threshold caused by language barriers, and at the same time, ensures the maintainability and comprehensiveness of game translation.

Referring to FIG. 1, it shows a flowchart of a game translation method according to one or more embodiments of the present disclosure, focusing on the process of using the game translation method, which may include the following steps 101-105.

Step 101, providing a target operating system on a terminal device by running a simulator.

Usually, the release and running (or operation) of a game program may be implemented in the form of a binary program. Part of the contents of the binary program may include a code segment and a data segment. When releasing the game program, the code segment and the initialized or uninitialized data segment may be loaded into the memory, so that when the game program is running, the computer or virtual machine can read the executable contents of the code segment loaded into the memory to run the program. The code segment contains binary data that can be understood and executed by the computer, and the binary data contained in the code segment can be used to decide the functions of the program and the performance of the program.

The manual operation of the language resource package to achieve game translation or localization has limitations and is not universal, whereas in the embodiments of the present disclosure, the translation of the game interface text can be realized without modifying the game language resource package.

In an embodiment of the present disclosure, the code logic in the game program may be processed, and the binary data contained in the code segment may be used to decide the functions of the program and the performance of the program. The function and performance of running of the program may be achieved by calling the APIs of the operating system or virtual machine, so the processing of the code logic may essentially be processing the "libdl.so" library and IL2CPP-related APIs. For example, when the "libdl.so" library and IL2CPP-related APIs need to be processed, a containerization technology on the Android platform may allow the game program to run in a relatively independent sandbox environment which enables the APIs that need to be called by the game program to be controllable. In this case, a simulator may be run on the terminal device to provide this target operating system.

In the terminal device, the running simulator may be used to simulate the running environment of the operating system, that is, the provided target operating system may be the simulated running environment of the operating system, which can provide a closed environment for the target game program in subsequent runs, and enable the target operating system to support the control function for the game logic, and then control a system interface function that needs to be called by the game program through the target operating system.

Step 102, in response to a trigger operation on an icon of a target game program in the simulator, controlling the running of the target game program in the target operating system.

The simulator may be an application program configured on the terminal device. For example, when the application program is running, an operating environment where the game logic is controllable may be provided by the containerization technology.

In an embodiment of the present disclosure, the target operating environment provided by the simulator may provide a closed environment for the target game program in subsequent runs. In this case, the target game program may be controlled to run in the target operating system in order to control the running target game program through the game logic control function provided in the target operating system.

For example, an application program configured as a simulator on the terminal device may be a game accelerator. The accelerator may be an application program without installation which may include multiple icons of game programs displayed on an accelerator interface for the user. After the user double-clicks to use the accelerator, and after verification is successful, one of the icons of game programs may be directly selected for acceleration through the trigger operation, and the game program to be accelerated of the selected icon is the triggered target game program.

Referring to FIG. 2, it shows a schematic diagram of a relationship between the simulator and the target game program according to one or more embodiments of the present disclosure. It is assumed that the application program configured as the simulator is a game accelerator Android client, which may run on the terminal device and can provide a closed target operating system for the terminal device. It is further assumed that the selected game program to be accelerated is the target game program to be run, and in the embodiment of the present disclosure, the game program needs to be run in the built sandbox environment. In these cases, the target operating system may be provided in the game accelerator client, so that when the target game program to be translated is accelerated to run through the accelerator client, the game process can be run in a containerized sandbox environment. The containerized sandbox environment may be built by the game accelerator Android client using the containerization technology.

Step 103, determining a target file in the target game program.

The code logic in the target game program is processed, for example, the code logic for setting the game interface text may be processed, so the target file may include code logic for first interface text setting, and the determined code logic for first interface text setting may refer to the code logic used to set the game interface text in the target game program.

Step 104, setting code logic with translation function in the code logic for first interface text setting, and translating original text information in a game interface by the code logic with translation function to obtain target text information.

In an embodiment of the present disclosure, when running the target game program in the target operating system, the code logic for first interface text setting of the target game program may be set. For example, the code logic with translation function is set in the code logic for first interface text setting, so that the game interface text can be translated through the code logic with translation function.

The set code logic with translation function may be located before the code logic for first interface text setting.

For example, the function and performance of running the game program may be achieved by calling the APIs of the operating system or virtual machine, which in the embodiment of the present disclosure may be achieved by the program calling the APIs of the UI component text setting. That is, a piece of code logic with translation function is inserted at the beginning of the logic part of the APIs of the UI component text setting, so that in the language display of the software UI, the original text information of the game program can be obtained through the inserted code logic with the translation function. The original language of the original text information is translated by machine translation and partial manual proofreading to obtain the translated language, i.e., the target text information, which is then displayed in the game interface of the game program. The machine translation adopted for the code logic may realize the real-time translation of the original language of the software UI, and the accuracy of the translation may be guaranteed to a certain extent based on some manual proofreading sessions.

Step 105, displaying, through code logic for second interface text setting, a corresponding game interface according to the target text information.

After running the code logic with translation function to translate the original text information of the target game program, the code logic for second interface text setting may be run to display the target text information after translation, so as to realize the translation and display of the interface text of the game process.

In practical applications, the translated interface text is displayed according to the control function for the game logic and the code logic with the translation function. For example, the code logic at a to-be-modified code logic position may be intercepted through the control function for the game logic. In this case, the code logic with translation function may be acquired for replacement at the to-be-modified code logic position, and the code logic before modification and replacement may be backed up. The backup code logic before modification and replacement is the code logic for second interface text setting. And then, the code logic with translation function set in the code logic for first interface text setting is run to translate the interface text, and the translated interface text is displayed by using the backup code logic for second interface text setting.

In the embodiments of the present application, the target game program may be run on the target operating system provided by running the simulator: the code logic with translation function may be set in the code logic for first interface text setting of the target game program: the original text information in the game interface is translated through the code logic with translation function; and then the corresponding game interface is displayed according to the target text information through the code logic for second interface text setting, so as to realize the translation and display of the game interface text when the game program is running. Based on the technology of containerization and general translation, it realizes the translation of the original text of the game based on the set code logic with translation function in the text display of the game interface by rewriting and replacing the code logic for the UI text setting; and by hooking the APIs related to the UI text setting, it may theoretically cover all IL2CPP-based Unity 3D games, without specific logic processing for specific games, which reduces the game use threshold caused by language barriers, and at the same time, ensures the maintainability and comprehensiveness of game translation.

Referring to FIG. 3, it shows a flowchart of a game translation method according to one or more embodiments of the present disclosure, focusing on the technical implementation process of the game translation method, which may include the following steps 301-303.

Step 301, building a sandbox environment for the game program through an application program configured on the terminal device. In an embodiment of the present disclosure, in order to make the APIs that the game program needs to call be in the sandbox environment controllable by the application program, the sandbox environment may be built through the application program configured on the terminal device.

The pre-built sandbox environment may be implemented by the Android application program through containerization technology, which may refer to the containerized environment for Unity 3D games to run, and may be the operating environment of the operating system simulated by means of software. In the built sandbox environment, the system API calls required in the game process need to go through a layer of transit, that is, the calls of the system APIs are in a controllable state, so a hook operation may be performed on the APIs of some key C library functions, such as "dlopen" function (a function used by a dynamic link library, which may be used to open the dynamic link library).

For example, in the Android system, the pre-built containerized environment of the application program configured on the terminal device, i.e., the sandbox environment may be implemented using the Virtual App's containerization.

Step 302, intercepting, during the running of the target game program, a dynamic library open function for a dynamic link library of the target game program through the control function for the game logic.

In practical applications, after the sandbox environment is built by the application program through containerization technology, that is, after a closed target operating environment is provided, the Unity 3D game may be loaded and run in the pre-built containerized environment, so that the target Unity 3D game program to be translated may be run in a controllable system initialized by containerization, and the application program may control the game logic running during the running of the target game program, and in turn may control the system interface function that needs to be called during the running of the target game program.

In the process of staring the Unity 3D game program, a system library needs to be loaded according to the design of the Android application framework. The loaded system library may be a dynamic link library; so as to realize the game logic of the game process through the loaded dynamic link library. The loading of the dynamic link library may be realized through a dynamic library open function, i.e., "dlopen" function. That is, the dynamic library open function may be used for loading a game logic function library during the running of the game program.

It should be noted that the loaded dynamic link library may include "libdl.so" library, "libc.so" library, "libc++.so" library, "libandroid.so" library, etc., which is not limited in the embodiments of the present disclosure.

In an embodiment of the present disclosure, in the pre-built containerized environment, the implementation of the game logic needs to be based on the use of the dynamic link library. In order to realize the control of the game logic during the running of the target game program, the game logic may be controlled fundamentally, i.e., performing interception operation on the dynamic library open function used to open the dynamic library to intercept the dynamic link library to be used by subsequent game process, so as to realize the interception of the system interface function that needs to be called to run the game process.

For example, it is assumed that the ".so" library in subsequent game logic may be loaded through the dynamic library open function "dlopen". Since the "dlopen" function is located in the "libdl.so" library; the interception operation may be performed on the "libdl.so" function library: The interception of the "libdl.so" function library is essentially an interception of the "dlopen" function within the "libdl.so" library that is used to load the ".so" library in subsequent game logic.

In practical applications, the process of intercepting the dynamic library open function "dlopen" of the dynamic link library of the target game program may be realized based on the function information of the dynamic library open function "dlopen".

For example, the function information for the dynamic library open function may be acquired. The function information may include function symbol information and function position information. In this case, a pointing address of the dynamic library open function in a preset memory may be determined according to the function symbol information and the function position information. The game logic function library, loaded by the dynamic library open function during the running of the target game process, exists in the pointing address of the dynamic library open function in the preset memory: In this case, the interception operation may be performed on the loading of the game logic function library during the running of the target game program.

For example, it is assumed that the "dlopen" function is located in "libdl.so" library, the function symbol of the "dlopen" function may be acquired, and the relative position of the function symbol of the "dlopen" function in the "libdl.so" file may be read, which may be realized through static scanning analysis of the function symbol, and then the specific address of the function symbol of the "dlopen" function in the game process memory may be calculated and obtained, that is, the pointing address of the dynamic library open function in the preset memory. In this case, the inline hook technology may be used on the obtained specific pointing address to hook the ".so" library that needs to be loaded by the dynamic library open function "dlopen" in the subsequent running of the game logic, so that the ".so" library that needs to be loaded by the "dlopen" function is under the control of the containerized application, i.e., so that the game logic function that exists in the pointing address of the dynamic library open function in the preset memory and needs to be loaded by the dynamic library open function during the running of the game process, is in a controllable state.

Step 303, intercepting, based on an interception operation of loading the game logic function library, loading of the code logic for first interface text setting in the target game program, and adopting the code logic with translation function to rewrite the code logic for first interface text setting.

Inline hook is a relatively advanced hook method, which may be used to replace the code logic by directly modifying the runtime memory. It is a completely manual hook and jump back (or return) operation, and theoretically can realize hook at any position. However, the target game program is cached in the preset memory in sections, and manually inserting some code logic into a certain position may change the memory structure of the game program, which requires relocation of memory address to run the game program normally. Thus, in order to keep the memory structure of the target game program unchanged, hook may be implemented by replacing the code logic instead of direct insertion, i.e., rewriting the code logic. For example, in the case of intercepting the dynamic library open function, the interception operation of loading the game logic function library may be realized. That is, the loading of the function libraries in the "libil2cpp.so" related to all the logic of the game (including but not limited to rendering, event, network, etc.) may be intercepted through the interception of the "dlopen" function. In this case, the interception operation may be performed on the loading of the code logic for first interface text setting in the target game program, so that the code logic with translation function may be used to rewrite the code logic for first interface text setting.

In an embodiment of the present disclosure, the game logic function library loaded by the dynamic library open function may include an interface function for first interface text setting. In this case, the interception operation of the interface function for first interface text setting in the game process may be realized through the interception operation on the loading of the game logic function library, and the code logic for first interface text setting in the target game program may be rewritten using the code logic with translation function, so that the translation of the interface text may be realized in the language display of the game UI.

For example, step 303 may include the following substeps S11 and S12.

Sub-step S11, determining a code logic position where the code logic for first interface text setting is located in a memory code segment, and intercepting the interface function for first interface text setting according to the code logic position.

In practical applications, when intercepting the loading of the game logic function library, a dynamic library search function for the dynamic link library of the target game program may be acquired, and the dynamic library search function may be adopted to acquire a preset interface call function, and then a to-be-modified code logic position may be determined, by the preset interface call function, in the code logic position where the code logic for first interface text setting is located in the memory code segment.

For the interception operation of the interface function for first interface text setting, it is first necessary to acquire the interface function for first interface text setting, i.e., to acquire the API about the text setting operation of the text control in the game. For example, a hook operation may be performed on the API of the script backend IL2CPP via "dlsym" function and inline hook method to obtain the API about the text setting operation of the text control in the game (such as "Text.set_text").

For example, after intercepting the loading of "libil2cpp.so" library in the "dlopen" function, some public API calls in the "libil2cpp.so" library may be acquired through the "dlsym" function, and then the location of the text control "Text.set_text" in memory may be obtained through the above public APIs.

Sub-step S12, at the code logic position, calling rewritten code logic through the interface function for first interface text setting.

The rewritten code logic may include the code logic with translation function located before the code logic for first interface text setting and the code logic for first interface text setting.

After rewriting the code logic for first text interface setting, and jumping to the hooked code logic (i.e., the rewritten code logic) for execution, it is often necessary to retain the ability to call the original method to ensure the functional availability of the game program. In this case, the original method may also be called back for continued execution by using a return instruction in the hook method, which requires additional execution of the original instruction that has been replaced in the target method to ensure the integrity of the original method.

In practical applications, the interception operation may be performed on the code logic at the to-be-modified code logic position through the control function for the game logic: the code logic, at the to-be-modified code logic position in the memory code segment during the running of the target game program, may be replaced by the code logic with translation function: the code logic before modification and replacement may be backed up (the backup code logic may be the code logic for second interface text setting); and then the code logic with translation function may be run to translate the original text information of the interface, and the original text information may be displayed using the backup code logic for second interface text setting on the interface.

For example, an inline hook may be performed on the memory location of "Text.set_text" above to replace it with a piece of code logic with a translation function. In addition, the original logic of "Text.set_text", i.e., the code logic for first interface text setting, is backed up. When the interface text needs to be displayed, the original interface text that needs to be displayed may be acquired and determined as the interface text that needs to be translated according to the range of the character set. The original interface text is translated by using the lookup table or calling the translation API to obtain the translated interface text, and then, the backup "Text.set_text" (i.e., the code logic for second interface text setting) may be called to set the translated interface text into the UI control, which finally achieves the purpose of translation or localization.

It should be noted that since the backup "Text.set_text" logic is called, it may be guaranteed that the translated interface text can be normally set to the UI control, and displayed on the game UI interface successfully. In addition, for the interface text embedded in the code, since it is also displayed through the UI control "Text.set_text" after the above process, the interface text embedded in the code may also be translated and localized, which can theoretically realize the translation or localization of the interface text displayed on the UI interface. Furthermore, the interface text displayed on the UI interface is a single sentence or entry text, without the need to analyze the format of the game language resource entry, which is convenient and operable, and since the language resource package has not been changed, there is no need to additionally consider the game's integrity verification mechanism for language resource package.

In the embodiments of the present disclosure, based on the technology of containerization and general translation, it may theoretically cover all IL2CPP-based Unity 3D games by hooking the APIs related to the UI text setting, without specific logic processing for specific games, which reduces the game use threshold caused by language barriers, and at the same time, ensures the maintainability and comprehensiveness of game translation.

In order to facilitate those skilled in the art to further understand the game translation method proposed in the embodiments of the present disclosure, it is described below in connection with an application process of the game translation method.

Figure 4:
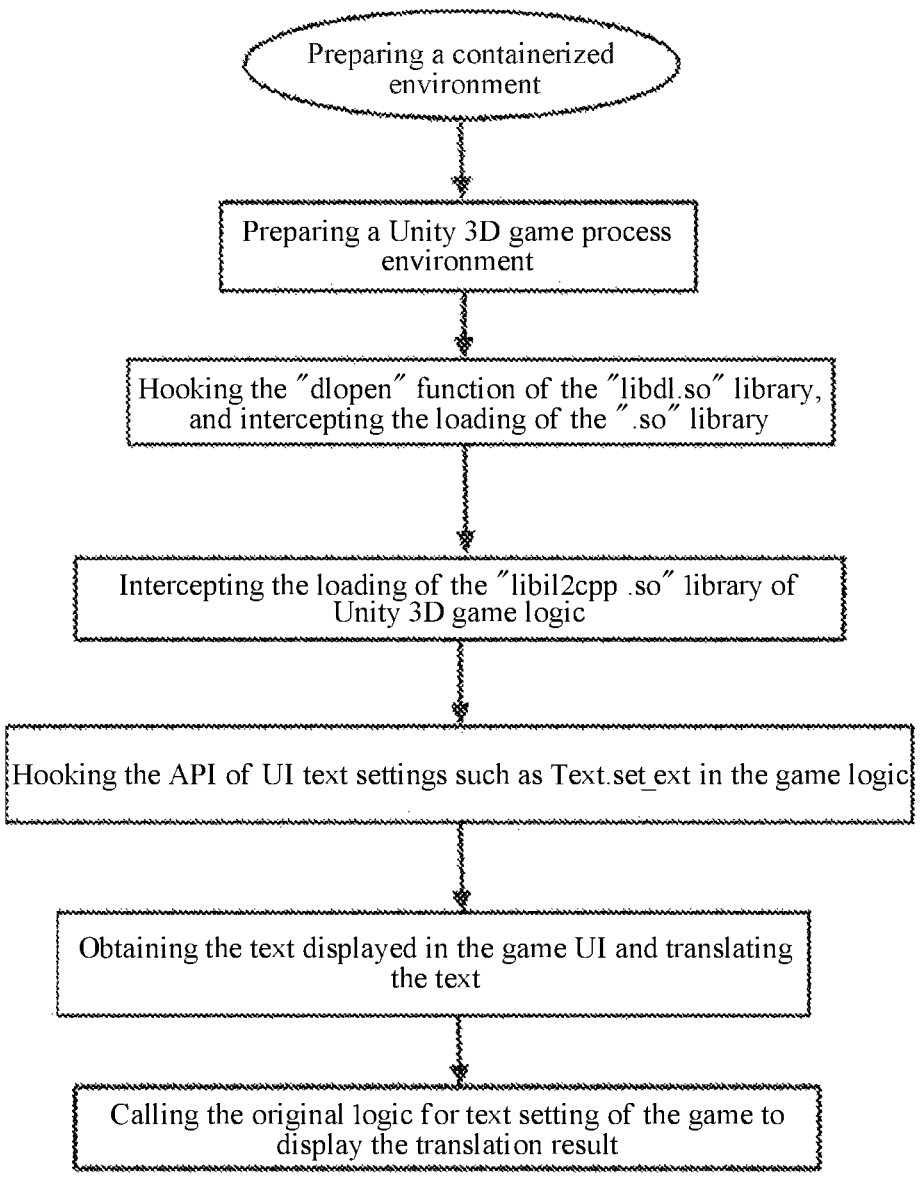
FIG. 4 is a schematic diagram of an application process of game translation according to one or more embodiments of the present disclosure.

Referring to FIG. 4, it shows a schematic diagram of the application process of the game translation method according to one or more embodiments of the present disclosure. For example, it may be realized by running the target game program in the target operating system provided by the application program through containerization technology, that is, in the pre-built sandbox environment.

In the implementation of running the target game program in the closed containerized environment, it may be divided into pre-running of the game process and running of the game process.

Before the target game program runs, the containerized environment may be prepared so that the sandbox environment capable of running the Unity 3D game may be prepared, which may be realized by simulating the operating environment of the operating system through software (such as a simulator, which may be an application program configured on a terminal device). In the built sandbox environment, the system API calls required by the target game program need to go through a layer of transit, that is, the system API calls can be in a controllable state.

In this case, the accelerator client may respond to the trigger operation on the icon of the game program to determine one of the game software selected by the user, and accelerate the target game program corresponding to the triggered icon of the game program. The selected game program to be accelerated is the target game program to be translated, i.e., the target Unity 3D game program to be translated.

During the running of the target game program, the Unity 3D game may be loaded and run in the pre-prepared containerized environment, so that the target Unity 3D game program to be translated runs in a containerized and initialized controllable system process.

The controllability of the target Unity 3D game program to be translated may be manifested in that: in the process of starting the Unity 3D target game program, the hook operation is performed on the dynamic link library, such as the "dlopen" function in the "libdl.so" library that is used to load the ".so" library in subsequent game logic, which in turn allows for symbol analysis, acquisition and hook operation on the ".so" library in subsequent game logic: the loading of libraries related to all the logic of the game (including but not limited to rendering, events, network, etc.) of the "libil2cpp.so" library may be intercepted in the hooked "dlopen" function, and in this case, through the "dlsym" function and the inline hook method, the hook operation is performed on the APIs of the IL2CPP script backend, and the APIs (such as "Text.set_text", etc.) related to the text setting operations of the text controls in the game are obtained based on the inline hook technology and the hooked APIs of the IL2CPP script backend; and then in the hooked "Text.set_text" function (i.e., the code logic for first interface text setting), when the interface text needs to be displayed, the code logic with translation function set in the code logic for first interface text setting is used to translate the interface text to be displayed, in order to obtain the translated interface text, and the backup "Text.set_text" (the code logic for second interface text setting) is called to set the translated interface text into the UI control, which finally achieves the purpose of translation or localization.

It should be noted that the embodiments of the present disclosure can be implemented based on the Android platform, while on the Windows platform, a DLL Proxy technical solution can be used to replace the part of the containerization to intercept the loading of the game logic dynamic library, which realizes the localization or translation of interface text through a similar process, and the embodiments of the present disclosure are not limited thereto.

In an embodiment of the present disclosure, the implementation of the containerized environment may have many uncontrollable factors, such as system upgrades or system API changes, resulting in the containerized sandbox environment that is less compatible with Unity 3D game running on it. In an alternative solution, virtualization technology may be used instead of containerization, e.g., using pure software to simulate a brand new Android operating environment, similar to the simulator in the Android development tools, in which all APIs refer to the Android standard for implementation, to solve some of the compatibility problems encountered when the Unity 3D game is running. In another alternative solution, the method of repackaging and re-signing the game package may be used instead of containerization. For example, the translation and localization logic may be inserted through a separate ".so" library. In this solution, a modified game software package is acquired, and when it runs on the actual Android system after installation, the compatibility problems introduced are almost zero.

In the embodiments of the present disclosure, based on the technology of containerization and general translation, it realizes the translation of the original text of the game based on the set code logic with translation function in the text display of the game interface by rewriting and replacing the code logic for the UI text setting; and by hooking the "libdl.so" library and APIs related to IL2CPP, it realizes a general game translation technology without modifying the game package. It may theoretically cover all IL2CPP-based Unity 3D games, without specific logic processing for specific games, which reduces the game use threshold caused by language barriers, and at the same time, ensures the maintainability and comprehensiveness of game translation.

It should be noted that, the method embodiments are described as a series of combinations of actions for the sake of simplicity, but those skilled in the art should be aware that the embodiments of the present disclosure are not limited by the order of the described actions, as certain steps may be carried out in a different order or at the same time according to the embodiments of the present disclosure. Furthermore, those skilled in the art should also be aware that the embodiments described in the specification belong to preferred embodiments, and the actions involved are not necessarily required by the embodiments of the present disclosure.

Figure 5:
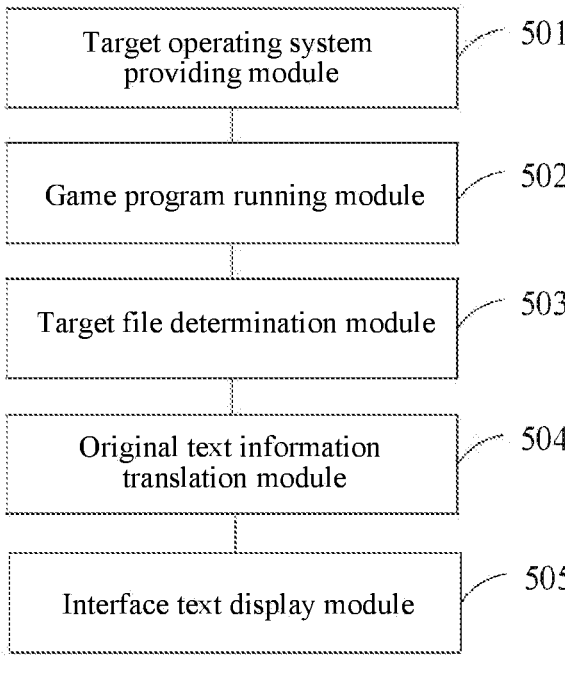
FIG. 5 is a structural block diagram of a game translation apparatus according to one or more embodiments of the present disclosure.

According to some embodiments of the present disclosure, a game translation method is provided, including:

provide a target operating system on a terminal device by running a simulator, wherein the simulator is an application program configured on the terminal device;

in response to a trigger operation on an icon of a target
game program in the simulator, controlling running of
the target game program in the target operating system;
determining a target file in the target game program,
wherein the target file includes code logic for first interface text setting;
setting code logic with translation function in the code
logic for first interface text setting, and translating
original text information in a game interface by the
code logic with translation function to obtain target text
information; and displaying, through code logic for
second interface text setting, a
corresponding game interface according to the target text
information.
In some embodiments, the simulator has a control function for game logic in the target game program, and setting
the code logic with translation function in the code logic for
first interface text setting, includes:
adopting the code logic with translation function to
rewrite the code logic for first interface text setting
through the control function for the game logic.
In some embodiments, adopting the code logic with
translation function to rewrite the code logic for first inter-
face text setting through the control function for the game
logic, includes:
intercepting, during the running of the target game pro-
gram, a dynamic library open function for a dynamic
link library of the target game program through the
control function for the game logic, wherein the
dynamic library open function is configured for loading
a game logic function library of the target game pro-
gram during the running of the target game program;
and
intercepting, based on an interception operation of load-
ing the game logic function library, loading of the code
logic for first interface text setting in the target game
program, and adopting the code logic with translation
function to rewrite the code logic for first interface text
setting.
In some embodiments, intercepting the dynamic library
open function for the dynamic link library of the target game
program, includes:
acquiring function information for the dynamic library
open function, wherein the function information
includes function symbol information and function
position information;
determining a pointing address of the dynamic library
open function in a preset memory according to the
function symbol information and the function position
information, wherein the game logic function library,
loaded by the dynamic library open function during the
running of the target game program, exists in the
pointing address; and
intercepting the loading of the game logic function library
during the running of the target game program.
In some embodiments, the game logic function library
loaded by the dynamic library open function includes an
interface function for first interface text setting:
intercepting the loading of the code logic for first interface
text setting in the target game program, and adopting
the code logic with translation function to rewrite the
code logic for first interface text setting, includes:
determining a code logic position where the code logic for
first interface text setting is located in a memory code
segment, and intercepting the interface function for first
interface text setting according to the code logic posi-
tion; and at the code logic position, calling rewritten code logic
through the interface function for first interface text
setting, wherein the rewritten code logic includes the
code logic with translation function before the code
logic for first interface text setting and the code logic
for first interface text setting.
In some embodiments, determining the code logic posi-
tion where the code logic for first interface text setting is
located in the memory code segment, includes:
when intercepting the loading of the game logic function
library, acquiring a dynamic library search function for
the dynamic link library of the target game process, and
adopting the dynamic library search function to acquire
a preset interface call function; and
determining, by the preset interface call function, a to-be-
modified code logic position in the code logic position
where the code logic for first interface text setting is
located in the memory code segment.
In some embodiments, translating the original text infor-
mation in the game interface by the code logic with trans-
lation function to obtain the target text information,
includes:
intercepting code logic at the to-be-modified code logic
position through the control function for the game
logic;
replacing the code logic at the to-be-modified code logic
position with the code logic with translation function,
and backing up the code logic for second interface text
setting before the replacement; and
running the code logic with translation function to trans-
late the original text information.
Referring to FIG. 5, it shows a structural block diagram of
an embodiment of a game translation apparatus of the
present disclosure, which may include the following mod-
ules 501-505.
A target operating system providing module 501 is con-
figured to provide a target operating system on a
terminal device by running a simulator, wherein the
simulator is an application program configured on the
terminal device.
A game program running module 502 is configured to
control, in response to a trigger operation on an icon of
a target game program in the simulator, running of the
target game program in the target operating system.
A target file determination module 503 is configured to
determine a target file in the target game program,
wherein the target file comprises code logic for first
interface text setting.
An original text information translation module 504 is
configured to set code logic with translation function in
the code logic for first interface text setting, and trans-
late original text information in a game interface by the
code logic with translation function to obtain target text
information.
An interface text display module 505 is configured to
display, through code logic for second interface text
setting, a corresponding game interface according to
the target text information.
In an embodiment of the present disclosure, the simulator
has a control function for game logic in the target game
program; and the original text information translation mod-
ule 504 may include the following sub-module.
A code logic rewriting sub-module is configured to adopt
the code logic with translation function to rewrite the code
logic for first interface text setting through the control
function for the game logic.

In an embodiment of the present disclosure, the code logic rewriting sub-module includes the following units.

A dynamic library open function interception unit is configured to intercept, during the running of the target game program, a dynamic library open function for a dynamic link library of the target game program through the control function for the game logic, wherein the dynamic library open function is configured for loading a game logic function library of the target game program during the running of the target game program.

A code logic rewriting unit is configured to intercept, based on an interception operation of loading the game logic function library, loading of the code logic for first interface text setting in the target game program, and adopt the code logic with translation function to rewrite the code logic for first interface text setting.

In an embodiment of the present disclosure, the dynamic library open function interception unit includes the following subunits.

An open function information acquisition subunit is configured to acquire function information for the dynamic library open function, wherein the function information includes function symbol information and function position information.

A function pointing address determination subunit is configured to determine a pointing address of the dynamic library open function in a preset memory according to the function symbol information and the function position information, wherein the game logic function library, loaded by the dynamic library open function during the running of the target game program, exists in the pointing address.

A game logic loading interception subunit is configured to intercept the loading of the game logic function library during the running of the target game program.

In an embodiment of the present disclosure, the game logic function library loaded by the dynamic library open function includes an interface function for first interface text setting; and the code logic rewriting unit includes the following subunits.

An interface function interception subunit is configured to determine a code logic position where the code logic for first interface text setting is located in a memory code segment, and intercept the interface function for first interface text setting according to the code logic position.

A function calling and rewriting subunit is configured to, at the code logic position, call rewritten code logic through the interface function for first interface text setting, wherein the rewritten code logic includes the code logic with translation function before the code logic for first interface text setting and the code logic for first interface text setting.

In an embodiment of the present disclosure, the interface function interception subunit is further configured to: when intercepting the loading of the game logic function library, acquire a dynamic library search function for the dynamic link library of the target game program, and adopt the dynamic library search function to acquire a preset interface call function; and determine, by the preset interface call function, a to-be-modified code logic position in the code logic position where the code logic for first interface text setting is located in the memory code segment.

In an embodiment of the present disclosure, the original text information translation module includes the following sub-modules.

A code logic interception sub-module is configured to intercept code logic at the to-be-modified code logic position through the control function for the game logic.

A code logic replacement sub-module is configured to replace the code logic at the to-be-modified code logic position with the code logic with translation function.

A code logic backup sub-module is configured to back up the code logic for second interface text setting before the replacement.

An original text information translation sub-module is configured to run the code logic with translation function to translate the original text information.

As for the embodiments of the apparatus, since they are basically similar to the method embodiments, the description thereof is relatively simple, and for related parts, please refers to the part of the description of the method embodiments.

According to some embodiments of the present disclosure, an electronic device is further provided, including:

a processor, a memory, and a computer program stored in the memory and runnable on the processor, which, when run by the processor, causes the processor to implement the following method steps:

providing a target operating system on a terminal device by running a simulator, wherein the simulator is an application program configured on the terminal device;

in response to a trigger operation on an icon of a target game program in the simulator, controlling running of the target game program in the target operating system;

determining a target file in the target game program, wherein the target file includes code logic for first interface text setting;

setting code logic with translation function in the code logic for first interface text setting, and translating original text information in a game interface by the code logic with translation function to obtain target text information; and displaying, through code logic for second interface text setting, a corresponding game interface according to the target text information.

In some embodiments, the simulator has a control function for game logic in the target game program, and setting the code logic with translation function in the code logic for first interface text setting, includes:

adopting the code logic with translation function to rewrite the code logic for first interface text setting through the control function for the game logic.

In some embodiments, adopting the code logic with translation function to rewrite the code logic for first interface text setting through the control function for the game logic, includes:

intercepting, during the running of the target game program, a dynamic library open function for a dynamic link library of the target game program through the control function for the game logic, wherein the dynamic library open function is configured for loading a game logic function library of the target game program during the running of the target game program; and intercepting, based on an interception operation of loading the game logic function library, loading of the code logic for first interface text setting in the target game program, and adopting the code logic with translation function to rewrite the code logic for first interface text setting.

In some embodiments, intercepting the dynamic library open function for the dynamic link library of the target game program, includes:

acquiring function information for the dynamic library open function, wherein the function information includes function symbol information and function position information;

determining a pointing address of the dynamic library open function in a preset memory according to the function symbol information and the function position information, wherein the game logic function library, loaded by the dynamic library open function during the running of the target game program, exists in the pointing address; and intercepting the loading of the game logic function library during the running of the target game program.

In some embodiments, the game logic function library loaded by the dynamic library open function includes an interface function for first interface text setting:

intercepting the loading of the code logic for first interface text setting in the target game program, and adopting the code logic with translation function to rewrite the code logic for first interface text setting, includes:

determining a code logic position where the code logic for first interface text setting is located in a memory code segment, and intercepting the interface function for first interface text setting according to the code logic position; and at the code logic position, calling rewritten code logic through the interface function for first interface text setting, wherein the rewritten code logic includes the code logic with translation function before the code logic for first interface text setting and the code logic for first interface text setting.

In some embodiments, determining the code logic position where the code logic for first interface text setting is located in the memory code segment, includes:

when intercepting the loading of the game logic function library, acquiring a dynamic library search function for the dynamic link library of the target game process, and adopting the dynamic library search function to acquire a preset interface call function; and determining, by the preset interface call function, a to-be-modified code logic position in the code logic position where the code logic for first interface text setting is located in the memory code segment.

In some embodiments, translating the original text information in the game interface by the code logic with translation function to obtain the target text information, includes:

intercepting code logic at the to-be-modified code logic position through the control function for the game logic;

replacing the code logic at the to-be-modified code logic position with the code logic with translation function, and backing up the code logic for first interface text setting before the replacement; and running the code logic with translation function to translate the original text information.

In the embodiments of the present application, the target game program may be run on the target operating system provided by running the simulator: the code logic with translation function may be set in the code logic for first interface text setting of the target game program: the original text information in the game interface is translated through the code logic with translation function; and then the corresponding game interface is displayed according to the target text information through the code logic for second interface text setting, so as to realize the translation and display of the game interface text when the game program is running. Based on the technology of containerization and general translation, it realizes the translation of the original text of the game based on the set code logic with translation function in the text display of the game interface by rewriting and replacing the code logic for the UI text setting; and by hooking the APIs related to the UI text setting, it may theoretically cover all IL2CPP-based Unity 3D games, without specific logic processing for specific games, which reduces the game use threshold caused by language barriers, and at the same time, ensures the maintainability and comprehensiveness of game translation.

According to some embodiments of the present disclosure, a non-transitory computer-readable storage medium is provided. The computer-readable storage medium stores a computer program, which, when run by a processor, causes the processor to implement the following method steps:

providing a target operating system on a terminal device by running a simulator, wherein the simulator is an application program configured on the terminal device;

in response to a trigger operation on an icon of a target game program in the simulator, controlling running of the target game program in the target operating system;

determining a target file in the target game program, wherein the target file includes code logic for first interface text setting;

setting code logic with translation function in the code logic for first interface text setting, and translating original text information in a game interface by the code logic with translation function to obtain target text information; and displaying, through code logic for second interface text setting, a corresponding game interface according to the target text information.

In some embodiments, the simulator has a control function for game logic in the target game program, and setting the code logic with translation function in the code logic for first interface text setting, includes:

adopting the code logic with translation function to rewrite the code logic for first interface text setting through the control function for the game logic.

In some embodiments, adopting the code logic with translation function to rewrite the code logic for first interface text setting through the control function for the game logic, includes:

intercepting, during the running of the target game program, a dynamic library open function for a dynamic link library of the target game program through the control function for the game logic, wherein the dynamic library open function is configured for loading a game logic function library of the target game program during the running of the target game program; and intercepting, based on an interception operation of loading the game logic function library, loading of the code logic for first interface text setting in the target game program, and adopting the code logic with translation function to rewrite the code logic for first interface text setting.

In some embodiments, intercepting the dynamic library open function for the dynamic link library of the target game program, includes:

acquiring function information for the dynamic library open function, wherein the function information includes function symbol information and function position information;

determining a pointing address of the dynamic library open function in a preset memory according to the function symbol information and the function position information, wherein the game logic function library, loaded by the dynamic library open function during the running of the target game program, exists in the pointing address; and intercepting the loading of the game logic function library during the running of the target game program.

In some embodiments, the game logic function library loaded by the dynamic library open function includes an interface function for first interface text setting:

intercepting the loading of the code logic for first interface text setting in the target game program, and adopting the code logic with translation function to rewrite the code logic for first interface text setting, includes:

determining a code logic position where the code logic for first interface text setting is located in a memory code segment, and intercepting the interface function for first interface text setting according to the code logic position; and at the code logic position, calling rewritten code logic through the interface function for first interface text setting, wherein the rewritten code logic includes the code logic with translation function before the code logic for first interface text setting and the code logic for first interface text setting.

In some embodiments, determining the code logic position where the code logic for first interface text setting is located in the memory code segment, includes:

when intercepting the loading of the game logic function library, acquiring a dynamic library search function for the dynamic link library of the target game process, and adopting the dynamic library search function to acquire a preset interface call function; and determining, by the preset interface call function, a to-be-modified code logic position in the code logic position where the code logic for first interface text setting is located in the memory code segment.

In some embodiments, translating the original text information in the game interface by the code logic with translation function to obtain the target text information, includes:

intercepting code logic at the to-be-modified code logic position through the control function for the game logic;

replacing the code logic at the to-be-modified code logic position with the code logic with translation function, and backing up the code logic for second interface text setting before the replacement; and running the code logic with translation function to translate the original text information.

In the embodiments of the present application, the target game program may be run on the target operating system provided by running the simulator: the code logic with translation function may be set in the code logic for first interface text setting of the target game program: the original text information in the game interface is translated through the code logic with translation function; and then the corresponding game interface is displayed according to the target text information through the code logic for second interface text setting, so as to realize the translation and display of the game interface text when the game program is running. Based on the technology of containerization and general translation, it realizes the translation of the original text of the game based on the set code logic with translation function in the text display of the game interface by rewriting and replacing the code logic for the UI text setting; and by hooking the APIs related to the UI text setting, it may theoretically cover all IL2CPP-based Unity 3D games, without specific logic processing for specific games, which reduces the game use threshold caused by language barriers, and at the same time, ensures the maintainability and comprehensiveness of game translation.

Figure 6:
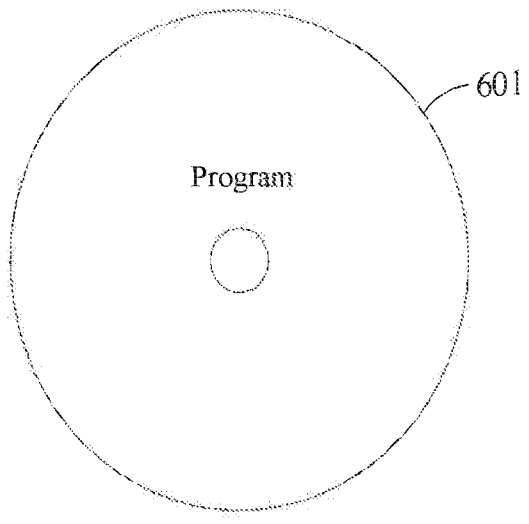
FIG. 6 is a structural block diagram of a computer-readable storage medium according to one or more embodiments of the present disclosure.

Referring to FIG. 6, it shows a structural block diagram of a computer-readable storage medium according to an embodiment of the present disclosure. A computer program may be stored on the computer-readable storage medium 601, wherein the computer program can be executed by a processor to realize each process of the above-mentioned embodiments of the game translation method, which can achieve the same technical effects, and will not be repeated here to avoid repetition.

Each embodiment in this specification is described in a progressive manner, each embodiment focuses on the difference from other embodiments, and the same or similar parts of various embodiments can be referred to each other.

It should be understood by those skilled in the art that the embodiments of the present disclosure may be provided as methods, apparatuses, or computer program products. Accordingly, embodiments of the present disclosure may take the form of an entirely hardware embodiment, an entirely software embodiment, or an embodiment combining software and hardware aspects. Furthermore, the embodiments of the present disclosure may take the form of a computer program product embodied on one or more computer-usable storage medium (including but not limited to disk storage, CD-ROM, optical storage, etc.) having computer-usable program code embodied therein.

Embodiments of the present disclosure are described with reference to flowcharts and/or block diagrams of methods, terminal devices (systems), and computer program products according to embodiments of the present disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, special purpose computer, embedded processor, or processor of other programmable data processing terminal device to produce a machine such that the instructions executed by the computer or the processor of other programmable data processing terminal device produce means for realizing the functions specified in one or more procedures of the flowchart and/or one or more blocks of the block diagram.

These computer program instructions may also be stored in a computer-readable memory capable of directing a computer or other programmable data processing terminal device to operate in a specific manner, such that the instructions stored in the computer-readable memory produce an article of manufacture including instruction means. The instruction means implements the functions specified in one or more procedures of the flowchart and/or one or more blocks of the block diagram.

These computer program instructions may also be loaded into a computer or other programmable data processing terminal device, so that a series of operation steps are executed on the computer or other programmable terminal device to produce computer-implemented processing, thereby the instructions executed on the computer or other programmable terminal device provide steps for implementing the functions specified in one or more procedures of the flowchart and/or one or more blocks of the block diagram.

Although preferred embodiments of the embodiments of the present disclosure have been described, those embodiments are subject to additional changes and modifications by those skilled in the art once the basic inventive concepts are known. Therefore, the appended claims are intended to be construed as including the preferred embodiments and all changes and modifications falling within the scope of the embodiments of the present disclosure.

Finally, it should also be noted that in this disclosure, relational terms such as "first" and "second" etc. are used only to distinguish one entity or operation from another, and do not necessarily require or imply that the existence of any such actual relationship or order between those entities or operations. Furthermore, the term "includes/comprises", "contains" or any other variation thereof is intended to cover a non-exclusive inclusion such that a process, method, article, or terminal device including a set of elements includes not only those elements, but also includes other elements not expressly listed, or also include elements inherent in such a process, method, article, or terminal device. Without further limitations, an element defined by the phrase "including/comprising a/an . . . " does not exclude the presence of additional identical elements in the process, method, article or terminal device including said element.

The game translation method and the game translation device provided by the present disclosure have been introduced above in detail. In this disclosure, specific examples are used to illustrate the principles and embodiments of the present disclosure. The description of the above embodiments is only used to help understand the method of the present disclosure and its core concept. In addition, for those of ordinary skill in the art, according to the concept of the present disclosure, there will be changes in the specific embodiment and application scope. In summary, the contents of this specification should not be constructed as a limitation of the present disclosure.

What is claimed is:

1. A game translation method, comprising:

providing a target operating system on a terminal device by running a simulator, wherein the simulator comprises an application program configured on the terminal device;

in response to a trigger operation on an icon of a target game program in the simulator, controlling running of the target game program in the target operating system;

determining a target file in the target game program, wherein the target file comprises a first code logic for a first interface text setting;

setting a second code logic with a translation function in the first code logic for the first interface text setting, and translating original text information in a first game interface of the target game program by the second code logic with the translation function to obtain target text information; and displaying, through a third code logic for a second interface text setting, a second game interface corresponding to the target text information according to the target text information;

wherein the simulator comprises a control function for game logic in the target game program, and wherein setting the second code logic with the translation function in the first code logic for the first interface text setting comprises:

adopting, through the control function for the game logic, the second code logic with the translation function to rewrite the first code logic for the first interface text setting;

wherein adopting the second code logic with the translation function to rewrite the first code logic for the first interface text setting through the control function for the game logic comprises:

intercepting, during the running of the target game program, a dynamic library open function for a dynamic link library of the target game program through the control function for the game logic, wherein the dynamic library open function is configured for loading a game logic function library of the target game program during the running of the target game program; and intercepting, based on an interception operation of loading the game logic function library, loading of the first code logic for the first interface text setting in the target game program, and adopting the second code logic with the translation function to rewrite the first code logic for the first interface text setting.

2. The method of claim 1, further comprising:

acquiring function information for the dynamic library open function, wherein the function information comprises function symbol information and function position information;

determining a pointing address of the dynamic library open function in a preset memory according to the function symbol information and the function position information, wherein the game logic function library, loaded by the dynamic library open function during the running of the target game program, is imported through the pointing address; and intercepting the loading of the game logic function library during the running of the target game program.

3. The method of claim 1, wherein the game logic function library loaded by the dynamic library open function comprises an interface function for the first interface text setting; and wherein intercepting the loading of the first code logic for the first interface text setting in the target game program, and adopting the second code logic with the translation function to rewrite the first code logic for the first interface text setting, comprises:

determining a code logic position where the first code logic for the first interface text setting is located in a memory code segment, and intercepting the interface function for the first interface text setting according to the code logic position; and at the code logic position, calling a rewritten code logic through the interface function for the first interface text setting, wherein the rewritten code logic comprises the second code logic with the translation function before the first code logic for the first interface text setting and the first code logic for the first interface text setting.

4. The method of claim 3, further comprising:

when intercepting the loading of the game logic function library, acquiring a dynamic library search function for the dynamic link library of the target game program, and adopting the dynamic library search function to acquire a preset interface call function; and determining, by the preset interface call function, a to-be-modified code logic position in the code logic position where the first code logic for the first interface text setting is located in the memory code segment.

5. The method of claim 4, wherein translating the original text information in the first game interface by the second code logic with the translation function to obtain the target text information comprises:

intercepting a code logic at the to-be-modified code logic position through the control function for the game logic;

backing up the first code logic for the first interface text setting to obtain the third code logic for the second interface text setting, and replacing the code logic at the to-be-modified code logic position with the second code logic with the translation function; and running the second code logic with the translation function to translate the original text information.

6. The method of claim 1, further comprising:

building a sandbox environment for the game program through the application program configured on the terminal device.

7. An electronic device comprising:

a processor, a memory, and a computer program stored in the memory and runnable on the processor, which, when run by the processor, causes the processor to:

provide a target operating system on the electronic device by running a simulator, wherein the simulator comprises an application program configured on the electronic device;

control, in response to a trigger operation on an icon of a target game program in the simulator, running of the target game program in the target operating system;

determine a target file in the target game program, wherein the target file comprises a first code logic for a first interface text setting;

set a second code logic with a translation function in the first code logic for the first interface text setting, and translate original text information in a first game interface of the target game program by the second code logic with the translation function to obtain target text information; and display, through a third code logic for a second interface text setting, a second game interface corresponding to the target text information according to the target text information;

wherein the simulator comprises a control function for game logic in the target game program, and wherein the processor is further configured to:

adopt, through the control function for the game logic, the second code logic with the translation function to rewrite the first code logic for the first interface text setting;

wherein the processor is further configured to:

intercept, during the running of the target game program, a dynamic library open function for a dynamic link library of the target game program through the control function for the game logic, wherein the dynamic library open function is configured for loading a game logic function library of the target game program during the running of the target game program; and intercept, based on an interception operation of loading the game logic function library, loading of the first code logic for the first interface text setting in the target game program, and adopting the second code logic with the translation function to rewrite the first code logic for the first interface text setting.

8. The electronic device of claim 7, wherein the processor is further configured to:

build a sandbox environment for the game program through the application program configured on the terminal device.

9. The electronic device of claim 7, wherein the processor is further configured to:

acquire function information for the dynamic library open function, wherein the function information comprises function symbol information and function position information;

determine a pointing address of the dynamic library open function in a preset memory according to the function symbol information and the function position information, wherein the game logic function library, loaded by the dynamic library open function during the running of the target game program, is imported through the pointing address; and intercept the loading of the game logic function library during the running of the target game program.

10. The electronic device of claim 7, wherein the game logic function library loaded by the dynamic library open function comprises an interface function for the first interface text setting, and the processor is further configured to:

determine a code logic position where the first code logic for the first interface text setting is located in a memory code segment, and intercept the interface function for the first interface text setting according to the code logic position; and at the code logic position, call a rewritten code logic through the interface function for the first interface text setting, wherein the rewritten code logic comprises the second code logic with the translation function before the first code logic for the first interface text setting and the first code logic for the first interface text setting.

11. The electronic device of claim 10, wherein the processor is further configured to:

when intercepting the loading of the game logic function library, acquire a dynamic library search function for the dynamic link library of the target game program, and adopt the dynamic library search function to acquire a preset interface call function; and determine, by the preset interface call function, a to-be-modified code logic position in the code logic position where the first code logic for the first interface text setting is located in the memory code segment.

12. The electronic device of claim 11, wherein the processor is further configured to:

intercept a code logic at the to-be-modified code logic position through the control function for the game logic;

back up the first code logic for the first interface text setting to obtain the third code logic for the second interface text setting, and replace the code logic at the to-be-modified code logic position with the second code logic with the translation function; and run the second code logic with the translation function to translate the original text information.

13. A non-transitory computer-readable storage medium storing a computer program, which, when run by a processor, causes the processor to:

provide a target operating system on a terminal device by running a simulator, wherein the simulator comprises an application program configured on the terminal device;

control, in response to a trigger operation on an icon of a target game program in the simulator, running of the target game program in the target operating system;

determine a target file in the target game program, wherein the target file comprises a first code logic for a first interface text setting;

set a second code logic with a translation function in the first code logic for the first interface text setting, and translate original text information in a first game interface of the target game program by the second code logic with the translation function to obtain target text information; and display, through a third code logic for a second interface text setting, a second game interface corresponding to the target text information according to the target text information;

wherein the simulator comprises a control function for game logic in the target game program, and wherein the processor is further configured to:

adopt, through the control function for the game logic, the second code logic with the translation function to rewrite the first code logic for the first interface text setting;

wherein the processor is further configured to:

intercept, during the running of the target game program, a dynamic library open function for a dynamic link library of the target game program through the control function for the game logic, wherein the dynamic library open function is configured for loading a game logic function library of the target game program during the running of the target game program; and intercept, based on an interception operation of loading the game logic function library, loading of the first code logic for the first interface text setting in the target game program, and adopting the second code logic with the translation function to rewrite the first code logic for the first interface text setting.

14. The non-transitory computer-readable storage medium of claim 13, wherein the processor is further configured to:

acquire function information for the dynamic library open function, wherein the function information comprises function symbol information and function position information;

determine a pointing address of the dynamic library open function in a preset memory according to the function symbol information and the function position information, wherein the game logic function library, loaded by the dynamic library open function during the running of the target game program, is imported through the pointing address; and intercept the loading of the game logic function library during the running of the target game program.

* * * * *